US010785318B2

(12) United States Patent
Dhamnani et al.

(10) Patent No.: US 10,785,318 B2
(45) Date of Patent: Sep. 22, 2020

(54) CLASSIFICATION OF WEBSITE SESSIONS USING ONE-CLASS LABELING TECHNIQUES

(71) Applicant: Adobe Inc., San Jose, CA (US)

(72) Inventors: Sunny Dhamnani, Bangalore (IN); Vishwa Vinay, Bangalore (IN); Lilly Kumari, Bihar (IN); Ritwik Sinha, Kolkata (IN)

(73) Assignee: ADOBE INC., San Jose, CA (US)

( * ) Notice: Subject to any disclaimer, the term of this patent is extended or adjusted under 35 U.S.C. 154(b) by 430 days.

(21) Appl. No.: 15/793,001

(22) Filed: Oct. 25, 2017

(65) Prior Publication Data

US 2019/0124160 A1 Apr. 25, 2019

(51) Int. Cl.
| | | |
|---|---|---|
| G06F 15/173 | (2006.01) | |
| H04L 29/08 | (2006.01) | |
| H04L 29/06 | (2006.01) | |
| G06K 9/62 | (2006.01) | |

(52) U.S. Cl.
CPC .......... *H04L 67/146* (2013.01); *G06K 9/6277* (2013.01); *G06K 9/6284* (2013.01); *H04L 63/1408* (2013.01); *H04L 63/1416* (2013.01); *H04L 63/1441* (2013.01); *H04L 2463/144* (2013.01)

(58) Field of Classification Search
None
See application file for complete search history.

(56) References Cited

U.S. PATENT DOCUMENTS

| | | | | |
|---|---|---|---|---|
| 9,027,127 B1* | 5/2015 | Soldo | ................. | H04L 63/1425 705/14.2 |
| 9,516,053 B1* | 12/2016 | Muddu | ............... | H04L 63/1408 |
| 10,326,789 B1* | 6/2019 | Vines | ................. | H04L 67/2814 |
| 2007/0136783 A1* | 6/2007 | Shelest | ............... | H04L 63/1408 726/1 |
| 2015/0365305 A1* | 12/2015 | Namata | ................. | G06Q 30/00 705/14.54 |

OTHER PUBLICATIONS

Retrieved from the internet: https://areyouahuman.com/state-of-the-human-internet-report.pdf.

(Continued)

*Primary Examiner* — Mohamed Ibrahim
(74) *Attorney, Agent, or Firm* — Kilpatrick Townsend & Stockton LLP

(57) ABSTRACT

A session identification system classifies network sessions with a network application as either human-generated or generated by a non-human, such as by a bot. In an embodiment, the session identification system receives a set of unlabeled network sessions, and determines a label for a single class of the unlabeled network sessions. Based on the one-class labeling information, the session identification system determines multiple subsets of the unlabeled network sessions. Multiple classifiers included in the session identification system generate probabilities describing each of the unlabeled network sessions. The session identification system classifies each of the unlabeled network sessions based on a combination of the generated probabilities.

20 Claims, 5 Drawing Sheets

(56) References Cited

OTHER PUBLICATIONS

Imperva Incapsula 2015 Bot Traffic Report, Imperva Inc., Humans Take Back the Web, Bad Bots Not Giving Any Ground, 2016, 6 pages.
PerimeterX Bot Defender Web, PerimeterX, Defend Against Gen-1 to Gen-4 Bot Attacks with PerimeterX Bot Defender, Retrieved from the internet: https://www.perimeterx.com/products/bot-defender/, 2017.
Products Pricing Developers About Signup, Developers, 2017, 6 pages.
Ahn et al., CAPTCHA: Using Hard AI Problems for Security, Proceedings of Eurocrypt, 2003, pp. 294-311.
Duskin et al., Distinguishing Humans from Robots in Web Search Logs: Preliminary Results Using Query Rates and Intervals, Proceedings of the 2009 Workshop on Web Search Click Data, 2009, pp. 15-19.
Elkan et al., Learning Classifiers from Only Positive and Unlabeled Data, Proceedings of the 14th ACM SIGKDD International Conference on Knowledge Discovery and Data Mining, Aug. 24-27, 2008, pp. 213-220.
Guo et al., Web Robot Detection Techniques Based on Statistics of their Requested Url Resources, Proceedings of the Ninth International Conference, Computer Supported Cooperative Work in Design, 2005, pp. 302-306.
Joe, Fraud-day with Integral Ad Science: The Way the Industry Measures Performance Online is Fundamentally Flawed, Adexchanger, Retrieved from the internet: https://adexchanger.com/ptatforms/fraud-day-with-integral-ad-science-the-way-we-measure-performance-online-is-fundamentally-flawed/, Aug. 8, 2014.
Joe, Fraud-day With Moat: Finding Fraud Without Calling It Fraud, Adexchanger, Retrieved from the internet: https://adexchangercom/online-advertising/fraud-day-with-moat-finding-fraud-without-calling-it-fraud/, Oct. 10, 2014.
Kabe et al., Determining WWW User Agents from Server Access Log, Parallel and Distributed Systems: Workshops, Seventh International Conference, Jul. 2000, pp. 173-178.
Lu et al., Web Robot Detection Based on Hidden Markov Model, Proceedings of International Conference on Communications, Circuits and Systems, 2006, pp. 1806-1810.
Schiff, Fraud-day With comScore: An Ad Impression Is a Terrible Thing to Waste, Adexchanger, Retrieved from the internet: https://adexchanger.com/platforms/fraud-day-with-comscore-an-ad-impression-is-a-terrible-thing-to-waste/, Sep. 26, 2014.
Schiff, Fraud-day With Distillery: Everyone Is Responsible for Fighting Fraud, Adexchanger, Retrieved from the internet: https://adexchanger.com/platforms/fraud-day-with-dstillery-everyone-is-responsible-for-fighting-fraud/, Sep. 12, 2014.
Schiff, Fraud-day With White Ops: Cut Off the Money, Cut Off the Fraud, Adexchanger, Retrieved from the internet: https://adexchanger.com/platforms/95989/, Sep. 5, 2014.
Tan et al., Discovery of Web Robot Sessions Based on their Navigational Patterns, Data Mining and Knowledge Discovery, vol. 6, No. 1, Jan. 2002, pp. 9-35.

\* cited by examiner

US 10,785,318 B2

CLASSIFICATION OF WEBSITE SESSIONS USING ONE-CLASS LABELING TECHNIQUES

FIELD OF THE INVENTION

This disclosure relates generally to the field of artificial intelligence, and more specifically relates to classifying unlabeled network sessions with a network application.

BACKGROUND

Network traffic is generated by human and by non-human visitors to a network application. A network application may handle interactions that originate from a software construct, such as a "bot," that is programmed to interact with the network application. A legitimate bot may interact with the network application in helpful ways, such as categorizing content for use in search results. A malicious bot may interact with the network application in harmful ways, such as generating repetitive traffic with the intent of causing failure of the network application, downloading content for illegal re-publication, or other malicious uses. In addition, interactions performed by a bot (including legitimate and malicious bots) may be included in analytics that are intended to represent user (e.g., human) interactions with the network application. Analytics including bot activity may misrepresent activities with the network application, and decisions that are based on such analytics may result in inappropriate business or operation decisions. Owners and operators of network applications may wish to prevent or identify traffic that is generated by bots.

An existing technique for identifying bot traffic is to include a robot exclusion protocol (e.g., "robots.txt") in a network application. The robot exclusion protocol may indicate network application areas or interaction types that bots are prohibited from accessing on the network application. Legitimate bots cooperate with the indicated prohibitions. Malicious bots may ignore the prohibitions, and generate interactions that do not comply with the robot exclusion protocol of the network application. In other existing technique for identifying bot traffic is to require identification information for an incoming request to the network application. Legitimate bots may self-identify as bots, such as by providing appropriate information to the network application. Interactions by self-identified bots may be filtered or otherwise handled based on the provided information. However, malicious bots may provide identification information that misrepresents the bot, such as by falsely indicating that the bot is a session associated with a human. An additional technique to identify bot traffic is applying a Turing test (e.g., a "captcha") to incoming requests, such as by requiring a requestor to identify words in an image. However, human visitors may be frustrated by the interruption of their activities, while a malicious bot may circumvent the test.

In addition, existing techniques may attempt to classify bot traffic by modeling behavioral patterns of humans or bots. Behavior modeling techniques often rely on domain knowledge describing multiple classes (e.g., human and non-human network traffic) to label the classes, and may not accurately classify network sessions if the labeling information is limited, or if labeling information is only available for one of the classes. In addition, behavioral modeling techniques may require manual interpretation of the domain knowledge to create multiple rules describing behavior of the classes.

It is desirable to develop techniques to accurately classify network traffic as human-generated or as non-human. In addition, it is desirable to accurately classify network traffic using limited labeling information about only one of the classes.

SUMMARY

According to certain embodiments, a session identification system receives a set of unlabeled sessions, such as sessions with a network application. The session identification system determines a labeled subset of the sessions, based on the presence of a session feature that is associated with human traffic. For example, a session feature associated with human-generated network traffic includes purchases performed on a website. Based on the labeled subset, the session identification system identifies an additional session feature that is included in the labeled subset of sessions. For example, the additional session feature includes a user identification that is used in sessions that include purchases on the website.

The session identification system determines a derived subset of the unlabeled sessions, based on the presence of the additional session feature in the derived subset. The set of unlabeled sessions, the labeled subset, and the derived subset are provided to trained classifiers. A first classifier is trained to generate a probability, based on the labeled subset, that an unlabeled session has the session feature associated with human network traffic. A second classifier is trained to generate a probability, based on the derived subset, that the unlabeled session has the session feature associated with human network traffic, given that the unlabeled session has the additional session feature. Based on a combination of the probabilities, the session identification system determines a probability that the unlabeled session is generated by a human.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
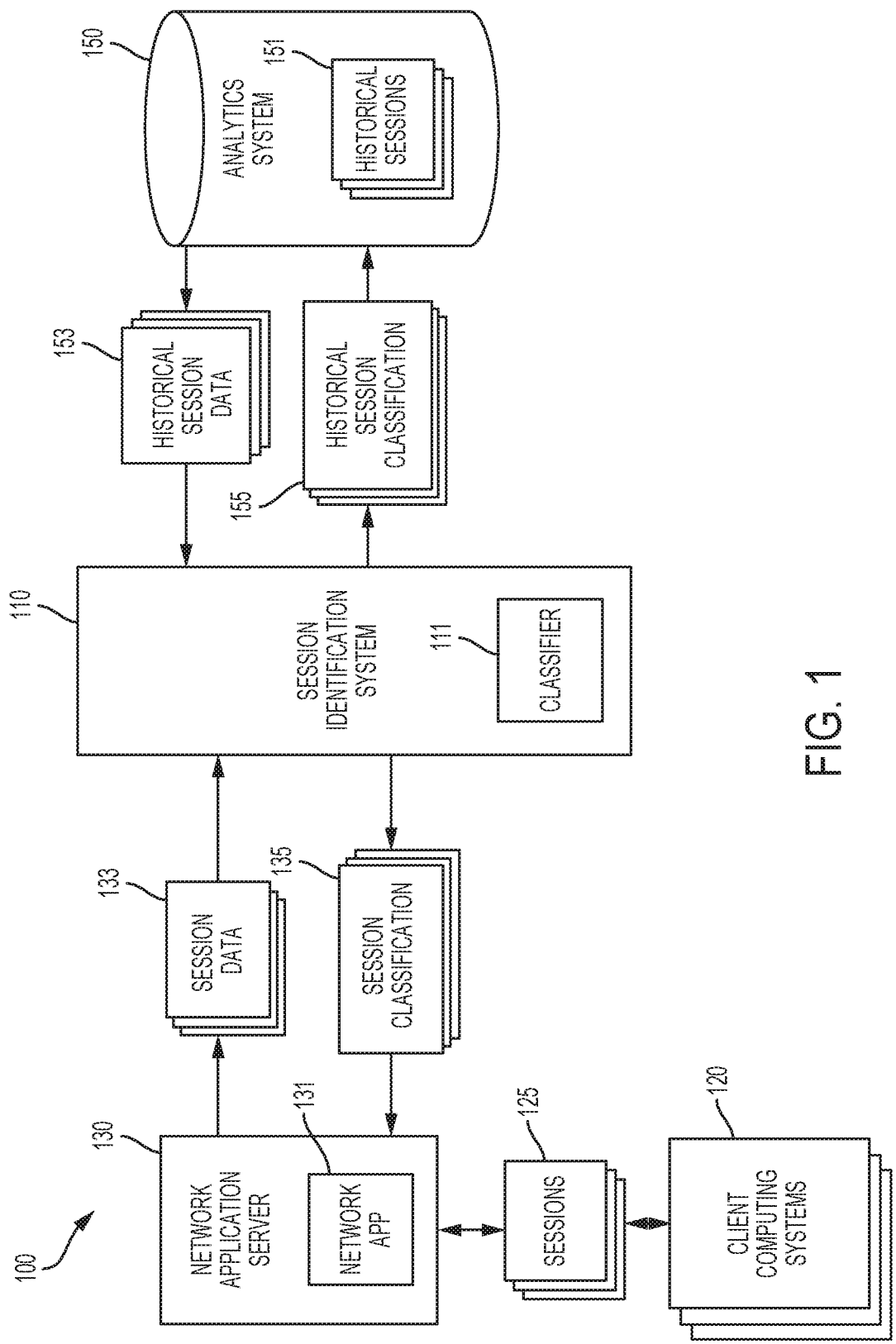
FIG. 1 is a block diagram depicting an example of a system for classifying network traffic as human-generated or non-human, according to certain embodiments.

As discussed above, prior techniques for identifying non-human network traffic do not accurately identify network sessions as generated by humans or non-humans. In addition, prior techniques for classifying sessions with a network application do not accurately classify the network sessions if labeling information is only available for one of the classes. Certain embodiments described herein provide for accurate classification of human and non-human sessions based on labeling information describing only one of the classes. For example, a subset of multiple unlabeled network sessions are labeled as belonging to one class, based on a single identified session feature. In addition, the remainder of the multiple unlabeled network sessions are classified based on the information describing the one labeled class.

The following examples are provided to introduce certain embodiments of the present disclosure. In this example, a session identification system receives a set of sessions, such as from a network application server that hosts a website. The sessions in the received set are unlabeled (e.g., are not identified as a session generated by a human or a non-human). In some cases, each session in the received set is associated with one or more session features that describe the respective session, such as features describing a computing device requesting the session or actions performed during the session. Additionally or alternatively, one or more of the session features is associated with network traffic that is generated by humans. For example, a "purchase feature," including interactions indicating that a purchase was made during the respective session, is a session feature associated with human-generated network traffic.

Based on the presence of the session feature associated with human-generated network traffic, the session identification system identifies a labeled subset of the unlabeled sessions. Additionally or alternatively, the session identification system determines one or more additional session features that are associated with the labeled subset of sessions. For example, the session identification system determines a user identification (e.g., a login name or password) that is associated with a respective session included in the labeled subset. Based on the additional session feature, the session identification system determines a derived subset of the unlabeled sessions. For example, the derived subset includes sessions generated by a user login associated with at least one purchase session.

In the session identification system, the unlabeled, labeled, and derived sessions are provided to multiple classifiers. The classifiers are each trained to generate, based on analysis of features associated with a set or subset of sessions, a probability describing each respective session in the set of unlabeled sessions. A first classifier is trained to generate a probability, based on analysis of features associated with sessions in the labeled subset, that an unlabeled session has the session feature associated with human network traffic. A second classifier is trained to generate a probability, based on analysis of features associated with sessions in the derived subset, that the unlabeled session has the session feature associated with human network traffic, given that the unlabeled session has the additional session feature. Based on a combination of the probabilities, the session identification system determines a probability that the unlabeled session is generated by a human. The session identification system provides the determined probability for the unlabeled session, such as to the network application server hosting the website.

As used herein, the term "session" refers to a group of interactions between computing systems, such as between client and a server. In some cases, the server is a computing system that is configured to receive requests from other computing systems. Additionally or alternatively, the client is a computing system that provides a request to establish a session with the server. For example, a given computing system receives session requests as a server and also requests sessions as a client. In some embodiments, the session is conducted via one or more of a computer network or computer communication protocols. Interactions in a session can include one or more of a request to establish a connection, an authentication, a transmission of data, a request to verify another interaction, or any other suitable interaction between computing systems. Interactions that are included in a session are determined, for example, based on suitable session features, such as a time duration of the session, a client computing system's identification information, or a specific type of interaction (e.g., a "keepalive" request). In some cases, a computing system (including a client or a server) has multiple sessions, including multiple sessions simultaneously or multiple sessions with a particular additional computing system. For example, a client establishes multiple sessions with a server, such that each of the multiple sessions is distinguished based on an application, on the client, that established the session, or any other suitable session feature.

As used herein, the term "session feature" refers to an attribute describing an aspect of a particular session. Session features include, without limitation, one or more of attributes of a computing system associated with the session (including the client or the server), attributes of a software application associated with the session, attributes of interactions included in the session, attributes describing how the session is conducted, or any other suitable attribute. For example, attributes include one or more of an internet protocol address (e.g., "IP address") associated with the session, a computing system type (e.g., a personal computer, a virtual device, a smartphone), a browser type, user authentication information, one or more interactions performed during the session, an elapsed time since a previous interaction, a type of interaction (e.g., a user conversion action, a "keepalive" request), a duration of the session, an application (e.g., on the client) that requests the session, a communication protocol that is used, a geographical location (e.g., of the client or server), or any other suitable attribute. In some cases, a session feature is based on a combination of two or more additional session features. For example, an identification attribute is based on a user login combined with an IP address associated with the user login.

As used herein, the terms "robot" and "bot" refer to a software construct that is capable of interacting with a network application. In some cases, a bot is a software program that is programmed to request a network session with the network application. Additionally or alternatively, the bot is programmed to interact with the network application without direction from a human user of the bot. For example, a bot that operates on a client computing system contacts the network application, requests a session, interacts with the network application, and closes the session without receiving input from a human using the client computing system. In some cases, the interactions of the bot include interactions with other users of the network application.

A bot that is programmed to interact with the network application in helpful ways is referred to herein as a legitimate bot. For example, a legitimate bot may interact with a network application by "crawling" a website to include the website in search engine results, or by providing information about the network application to other users (e.g., a customer service "chatbot"). A bot that is programmed to interact with a network application in harmful ways is referred to herein as a malicious bot. For example, a malicious bot may interact with a network application by downloading (e.g., "scraping") proprietary content, including creative content or business content (e.g., pricing information), from the application for illegal use. Additionally or alternatively, a malicious bot may generate repeated requests to the network application, such as to reduce performance of the application (e.g., denial of service attacks) or to generate false information about interactions with the application (e.g., fraudulent advertising impressions). In some cases, a malicious bot interacts with the network application in ways that are harmful to other users of the application, such as by encouraging users of a chat service to post to personal login information. In some cases, a bot, including a legitimate or a malicious bot, can reduce accuracy of information gathered by the network application. For example, if the bot does not self-identify as a bot (e.g., via a user-agent string), interactions by the bot can be inappropriately included in performance analytics for the network application.

As used herein, the term "classifier" refers to a software module capable of determining a classification of an input, such as an unlabeled session with a network application. In some cases, the classifier is included in a neural network, such as an algorithm performed by a neural network. Examples of a neural network including a classifier include, without limitation, a recursive neural tensor network, or any other suitable type of neural network. Additionally or alternatively, the classifier is capable of improving its determined classifications based on previous classifications or additional inputs. A classifier is trained, for example, using a body of data that is provided, during one or more training phases, to the classifier or to a neural network including the classifier. In some cases, training of a classifier is accomplished by supervised training, or by a combination of supervised and unsupervised training. In some cases, the training data includes sessions that are generated by a known source (e.g., from a known human or known non-human requestor).

As used herein, the term "label" refers to an identification of whether an input to a classifier belongs to a class. For example, a particular session with a network application has a label identifying whether the session belongs to a class of human-generated network sessions. The label is determined, for example, based on one or more features of the particular session. For example, a session having a feature indicating that a purchase was performed on a website has a label identifying that the session is associated with human-generated network traffic. In some cases, a classifier determines a label for an unlabeled session. Additionally or alternatively, a classifier analyzes a labeled session and determines a label for an unlabeled session based on the analysis.

As used herein, the term "network traffic" refers to communications between two or more computing systems via a computer network. For example, network traffic includes a session between a client and a server, or a request to establish a session, or any other suitable communication. In some cases, network traffic includes human-generated traffic, such as traffic originating from a computing system under the direction of a human being. Additionally or alternatively, network traffic includes non-human traffic, such as traffic originating from a computing system without direction from a human being. Network traffic includes, for example, communications relating to a network application, such as websites, games, applications operating on a personal computing system (e.g., "apps"), single-purpose applications, multi-purpose applications, or any other suitable network application. Additionally or alternatively, network traffic includes communications originating from one or more computing systems, such as a personal computer (e.g., a desktop, a laptop), a server device, a mobile computing device (e.g., a tablet computer, a smartphone), a wearable computing device, an Internet-of-Things device, a virtual device (e.g., a "virtual machine," a cloud-based computing system), or any other suitable computing system.

Referring now to the drawings, FIG. 1 is a diagram depicting a system 100 in which network traffic is classified as human-generated or non-human. In the system 100, a network application server 130 participates in one or more network sessions 125 with one or more client computing systems 120. In some cases, one or more of the network sessions 125 are unlabeled (e.g., as human-generated or non-human). The network application server 130 provides a network application 131, such as a website, that is accessible via one or more computing networks. A client, such as a client included in the client computing systems 120, requests access to the network application 131, such as by providing to the network application server 130 a request to establish a session. In some cases, the network application server 130 responds to the request by establishing a session with the requesting client, such as a session included in the sessions 125.

The system 100 includes a session identification system 110. The session identification system 110 includes, for example, one or more classifiers, such as classifier 111. In some cases, the classifier 111 is trained to generate a probability describing an input session. For example, the classifier 111 generates a probability based on session features associated with the input session. In some cases, an additional classifier generates an additional probability describing the input session.

In the system 100, the network application server 130 provides session data 133 to the session identification system 110. The session data 133 describes one or more unlabeled network sessions. The session data 133 includes, for example, session features that are associated respectively with one or more of the sessions 125. In some cases, the session data 133 includes one or more session features that are associated with human-generated network traffic. For example, the session data 133 includes session features indicating purchases made via the network application 131. Additionally or alternatively, a subset of the sessions 125 are associated with the session features associated with human-generated network traffic.

In an embodiment, the classifier 111 receives the session data 133. Based on analysis of the session data 133, the classifier 111 generates one or more probabilities respectively describing the sessions 125. A particular probability describes, for example, a likelihood that a respective particular session has the feature associated with human-generated network traffic. Additionally or alternatively, the session identification system 110 determines one or more session classifications 135, which classify respectively each session 125 that is associated with the session data 133. In some cases, the session classification 135 indicates whether a given session of sessions 125 is human-generated or non-human network traffic. Additionally or alternatively, the session classification 135 includes a label indicating a class of a previously unlabeled session of sessions 125.

The network application server 130 receives the session classification 135. In some cases, the network application server 130 performs an operation related to one or more of the sessions 125, based on the information included in the session classification 135. For example, responsive to determining that a particular one of sessions 125 is non-human, the network application server 130 terminates the non-human session, or filters (e.g., from analytics) interactions performed in the non-human session, or any other suitable action. Termination of a non-human session, for example, prevents potentially harmful interactions by a malicious bot. Filtering interactions from a non-human session improves, for example, accuracy of analytics describing interactions with a network application. Additionally or alternatively, responsive to determining that another one of sessions 125 is human-generated, the network application server 130 prioritizes interactions included in the human-generated session, or allocates additional computing or networking resources to the human-generated session, or any other suitable action. Prioritizing a human-generated session improves, for example, responsiveness of the network application to a user interacting with the network application (e.g., the user may have a better user experience with the application).

In some cases, the session identification system 110 provides a classification of a session in real time or substantially real time. For example, the session identification system 110 provides session classification 135 to network application server 130 while sessions 125 are extant, or within a relatively short period of time (e.g., 1-60 seconds) after one or more of sessions 125 are terminated. Additionally or alternatively, the session identification system 110 provides a classification of a historical session, such as based on data that is included in analytics data. In system 100, an analytics system 150 includes information describing one or more historical sessions 151. The historical session includes, for example, terminated sessions with a network application, including, but not limited to, the network application 131. In some cases, the analytics system 150 is associated with an owner or operator of network application server 130. Additionally or alternatively, the analytics system 150 is associated with an owner or operator of session identification system 110.

In an embodiment, the analytics system 150 provides historical session data 153 to the session identification system 110. In some cases, the historical session data 153 is provided in response to an analysis request, such as related to a network application associated with the historical session data 153. Additionally or alternatively, the historical session data 153 is provided in response to a training request, such as related to the session identification system 110. For example, the classifier 111 is trained or retrained based on the historical session data 153.

In some cases, the historical session data 153 includes one or more session features that are associated with human-generated network traffic, such as session features indicating purchases made via a network application. The classifier 111 receives the historical session data 153. Based on analysis of the historical session data 153, the classifier 111 generates one or more probabilities describing, for example, a likelihood that a respective historical session 151 has the feature associated with human-generated network traffic. Additionally or alternatively, the session identification system 110 determines one or more historical session classifications 155. In some cases, the historical session classification 155 indicates whether a given historical session 151 is human-generated or non-human network traffic. The analytics system 150 receives the historical session classification 155. In some cases, the analytics system 150 performs an operation related to one or more of the historical sessions 151, based on the historical session classification 155. For example, responsive to determining that a particular one of historical sessions 151 is non-human, the analytics system 150 filters (e.g., from an analysis request) interactions performed in the non-human session, or any other suitable action.

Figure 2:
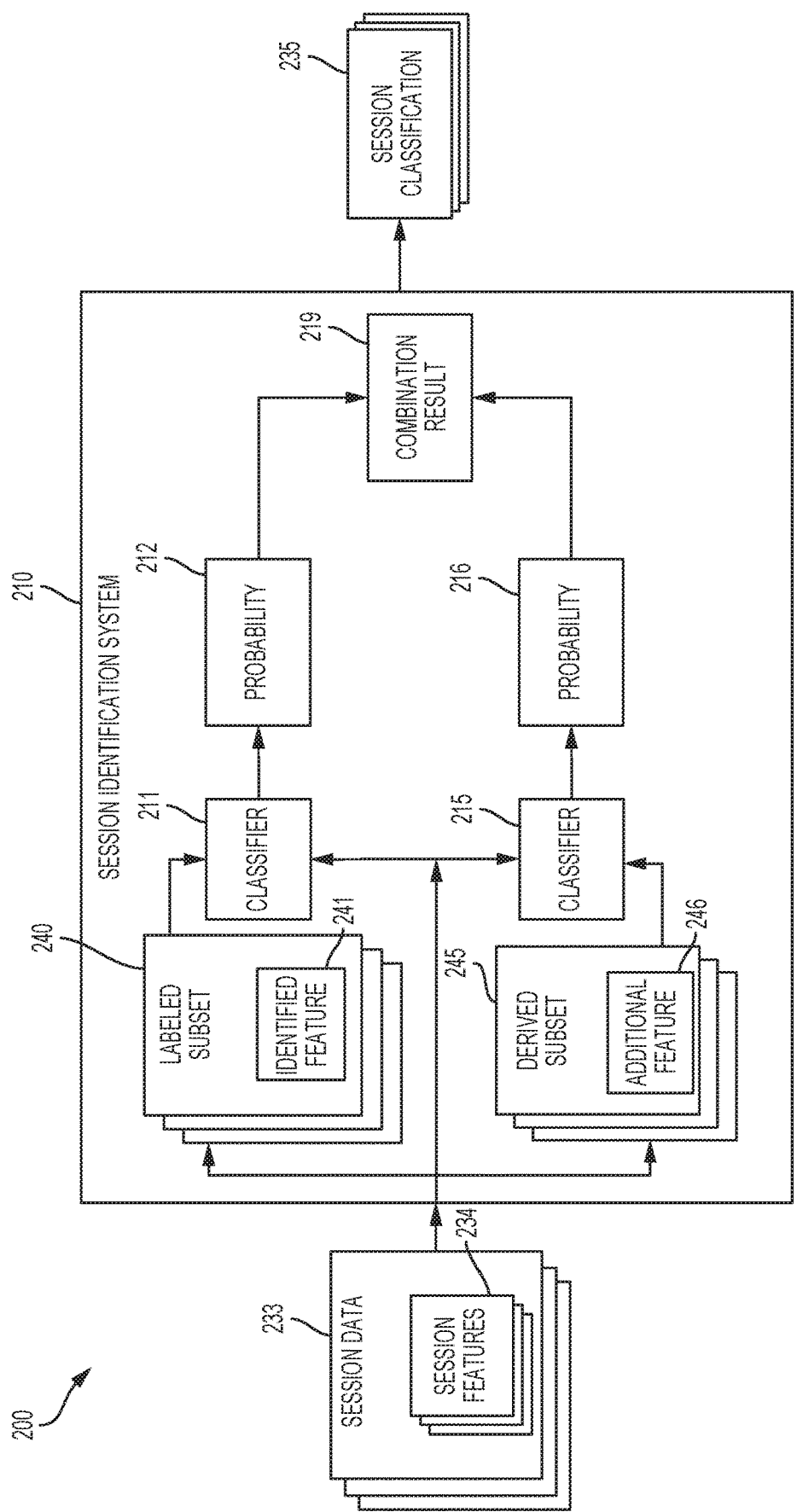
FIG. 2 is a diagram depicting an example of a system in which unlabeled network traffic is classified based on outputs from multiple classifiers, according to certain embodiments.

FIG. 2 is a diagram depicting a system 200 in which network traffic, including unlabeled network traffic, is classified as human-generated or non-human based on outputs from multiple classifiers. In system 200, a session identification system 210 includes a first classifier 211 and a second classifier 215. The session identification system 210 determines a classification of network traffic based in part on information provided by the classifiers 211 and 215.

In system 200, the session identification system 210 receives session data 233. The session data 233 includes information describing multiple network sessions, such as current sessions with a network application or historical sessions, as described in regards to FIG. 1. In some cases, each of the network sessions represented by the session data 233 is a human-generated session or a non-human session. Additionally or alternatively, the network sessions represented by the session data 233 are unlabeled network sessions (e.g., it is unknown if a particular session is human-generated or non-human). The session data 233 includes one or more session features 234. In some cases, each network session represented by the session data 233 is associated with one or more of the session features 234. For example, a particular network session represented by the data 233 is associated with a vector of session features that are included in the session features 234.

In an embodiment, the session identification system 210 identifies one or more of the session features 234 that are associated with human-generated network sessions. In some cases, the identified session feature 241 has an attribute that results from a human interaction with a network application. For example, the identified session feature 241 indicates that a product or service was purchased via the network application. In some cases, the identified session feature 241 indicates that a threshold of purchases were made (e.g., a monetary threshold, a quantity). Additionally or alternatively, the identified session feature 241 includes a combination of attributes that result from human interactions with the network application. For example, the identified session feature 241 indicates that a purchase was made via the network application, and that the purchase was associated with a location (e.g., a product shipped to an address). In some cases, the identified session feature 241 is determined based on characteristics of the network application associated with the network sessions. For example, a network application that receives donations to a nonprofit organization may have an identified session feature 241 indicating a contribution to the organization. Additionally or alternatively, a network application for an online gaming environment may have an identified session feature 241 indicating a purchase of in-game content, or interactions with representatives of the online gaming environment (e.g., contacting customer support).

In system 200, the session identification system 210 determines one or more subsets of network sessions based on the session data 233. In some cases, the session identification system 210 determines that one or more network sessions represented by the session data 233 has the identified session feature 241 associated with human-generated network sessions. Additionally or alternatively, the session identification system 210 determines that the network sessions including the identified session feature 241 are included in a labeled subset 240 of the network sessions. For example, responsive to determining that a particular network session is associated with the identified session feature 241 indicating a purchase, the particular network session is included in the labeled subset 240. In some cases, each network session included in the labeled subset is labeled (e.g., by the session identification system 210) as belonging to a class of human-generated network traffic. Additionally or alternatively, the labeled subset 240 includes portions of the session data 233 associated with the sessions having the identified session feature 241.

Additionally or alternatively, the session identification system 210 determines that one or more additional network sessions represented by the session data 233 are included in a derived subset 245 of the network sessions. In some cases, the additional network sessions are associated with an additional session feature 246 that is associated with one or more of the network sessions included in the labeled subset 240. For example, a network session included in the labeled subset 240 is associated with the identified session feature 241 and also with one or more features identifying the originator of the session (e.g., a user that initiated a purchase). The additional session feature 246 includes information indicating the session originator, such as one or more of an IP address, a user login, or any other suitable information. The derived subset 245 includes network sessions having the additional session feature 246, such as sessions generated by the originator of one or more of the sessions in the labeled subset 240. In some cases, the derived subset 245 includes sessions having each of the additional session feature 246 and the identified session feature 241. Additionally or alternatively, the derived subset 245 includes sessions having the additional session feature 246 but not the identified session feature 241. For example, the derived subset 245 includes sessions generated by a purchaser, but which do not include a purchase. In some cases, the derived subset 245 includes portions of the session data 233 associated with the sessions having the additional session feature 246.

In an embodiment, the classifier 211 receives the labeled subset 240 and the session data 233. Based on the information included in the labeled subset 240 and the session data 233, the classifier 211 generates a probability 212. The probability 212 indicates a probability that a particular unlabeled session represented by the session data 233 has the identified session feature 241.

Additionally or alternatively, the classifier 215 receives the derived subset 245 and the session data 233. Based on the information included in the derived subset 245 and the session data 233, the classifier 215 generates a probability 216. The probability 216 indicates a probability that the particular unlabeled session represented by the session data 233 has the identified session feature 241 given that the particular unlabeled session has the additional session feature 246.

In the system 200, the session identification system 210 combines the probability 212 and the probability 216. For example, the session identification system 210 generates a combination result 219 based on one or more mathematical operations based on the probabilities 212 and 216. In some cases, the combination result 219 indicates a probability that the particular unlabeled session represented by the session data 233 is a human-generated network session. For example, the combination result 219 indicates a probability that the particular unlabeled session was originated by a human user. Additionally or alternatively, the combination result 219 includes a probability that the particular unlabeled session was originated by a non-human (e.g., a bot). Based on the combination result 219, the session identification system 210 generates a session classification 235. In some cases, the session classification 235 includes a label generated for the particular unlabeled session.

In an embodiment, the classifiers 211 and 215 generate a respective probability for each of the unlabeled network sessions represented by the session data 233. Additionally or alternatively, the session identification system 210 generates one or more of a respective combination result and a respective classification for each of the unlabeled network sessions. In some cases, the session classification 235 includes label information for each of the unlabeled network sessions represented by session data 233. Additionally or alternatively, the session classification 235 is provided to another computing system, such as an analytical system or a network application server as described in regards to FIG. 1.

Figure 3:
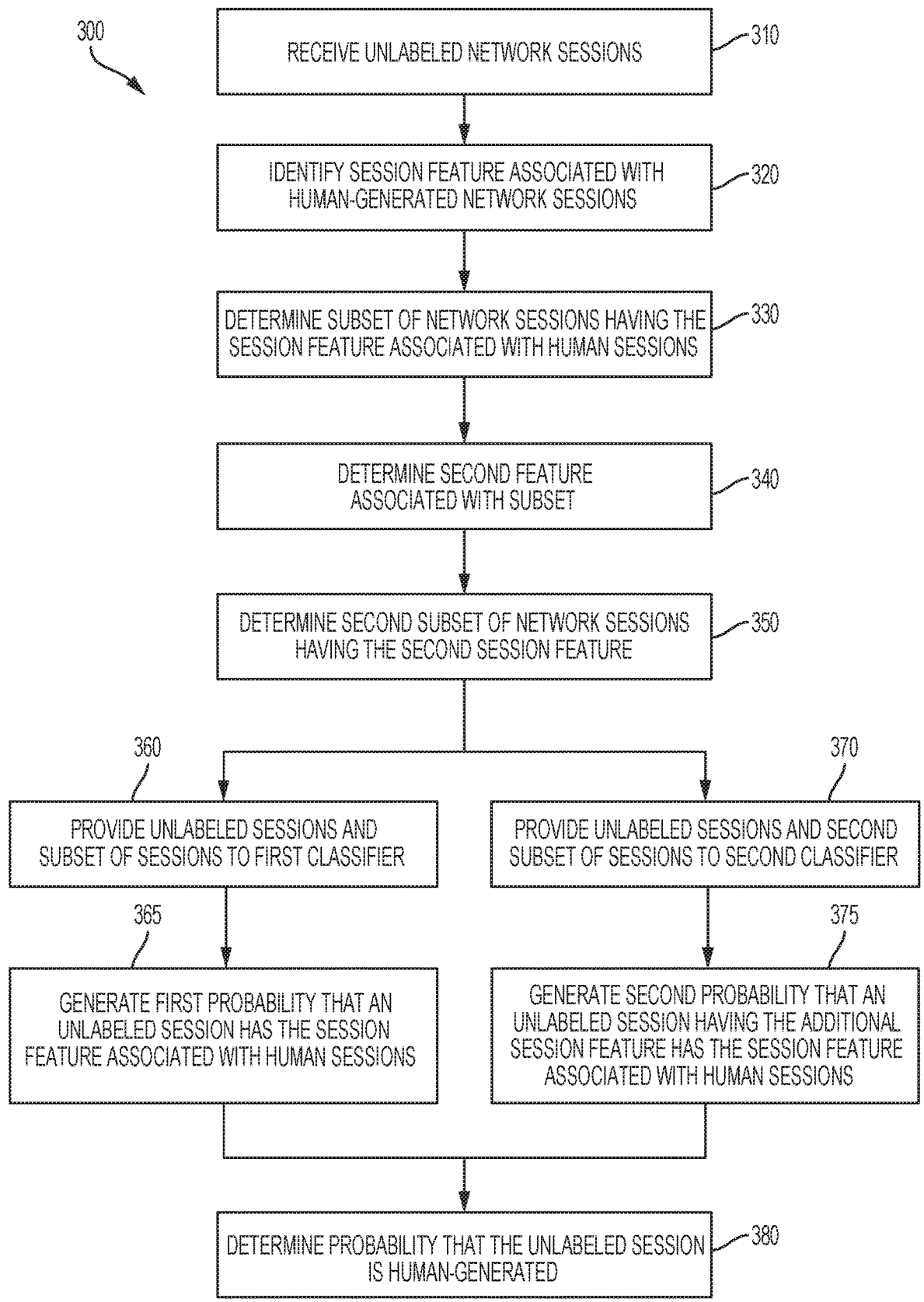
FIG. 3 is a flow chart depicting an example of a process for classifying unlabeled network sessions, according to certain embodiments.

FIG. 3 is a flow chart depicting an example of a process 300 for classifying unlabeled network sessions. In some embodiments, such as described in regards to FIGS. 1-2, a computing device executing a session identification system implements operations described in FIG. 3, by executing suitable program code. For illustrative purposes, the process 300 is described with reference to the examples depicted in FIGS. 1-2. Other implementations, however, are possible.

At block 310, the process 300 involves receiving one or more unlabeled network sessions. In some cases, a session identification system receives data describing the unlabeled network sessions. For example, the session identification system 110 receives session data 133 describing an unlabeled network session 125 between the client computing system 120 and the network application server 130, such as described in regards to FIG. 1. In some cases, the data describing the unlabeled network sessions includes session features, or data describing session features, that are associated with respective ones of the unlabeled network sessions.

At block 320, the process 300 involves identifying a first session feature that is associated with human-generated network sessions. In some cases, the first session feature is identified based on data describing the received unlabeled network sessions. For example, an identified session feature is based on features included in session data 133. Additionally or alternatively, the first session feature is based on information indicating a type of feature associated with human-generated network sessions. For example, the session identification system 110 receives information indicating that network sessions including a purchase are associated with human-generated network traffic. The information is received, for example, via a user interface associated with the session identification system 110, the network application server 130, or another suitable computing system. Based on the received information, the session application system 110 identifies that "purchase" session features are associated with human-generated network sessions.

At block 330, the process 300 involves determining a first subset of the unlabeled network sessions that have the first feature associated with human-generated sessions. In some cases, the sessions included in the first subset are labeled as human-generated sessions. For example, the session identification system 210 determines a labeled subset 240 that includes network sessions having the identified session feature 241. In some cases, the first subset includes sessions that included a purchase.

At block 340, the process 300 involves determining a second session feature that is associated with sessions included in the first subset. In some cases, the second session feature identifies an originator of a session having the first session feature. For example, the session identification system 210 determines an additional session feature 246 that is associated with sessions included in the labeled subset 240.

At block 350, the process 300 involves determining a second subset of the unlabeled network sessions that have the second feature. For example, the session identification system 210 determines the derived subset 245 that includes sessions having the additional session feature 246. In some cases, the second subset includes network sessions (including sessions that do not include a purchase) from an originator that has made a purchase in another session.

At block 360, the process 300 involves providing the unlabeled network sessions and the first subset of sessions to a first classifier. For example, the classifier 211 receives session data 233 describing unlabeled network sessions and the labeled subset 240. At block 365, the process 300 involves generating a first probability that a particular unlabeled session has the first session feature. For example, the classifier 211 generates the probability 212, indicating a probability that a particular unlabeled session represented by the session data 233 has the identified session feature 241.

At block 370, the process 300 involves providing the unlabeled network sessions and the second subset of sessions to a second classifier. For example, the classifier 215 receives session data 233 describing unlabeled network sessions and the derived subset 245. At block 375, the process 300 involves generating a second probability that a particular unlabeled session, which has the second session feature, has the first session feature. For example, the classifier 215 generates the probability 216, indicating a probability that the particular unlabeled session represented by the session data 233 has the identified session feature 241 given that the particular unlabeled session has the additional session feature 246.

At block 380, the process 300 involves determining a third probability that a particular unlabeled session is a human-generated network session. In some cases, the third probability is determined based on the first and second probabilities described in regards to blocks 365 and 375. For example, the session identification system 210 generates a combination result 219 based on the probabilities 212 and 216. Additionally or alternatively, the combination result 219 indicates a probability that a particular unlabeled session represented by the session data 233 is a human-generated network session.

Determining Probabilities

Figure 4:
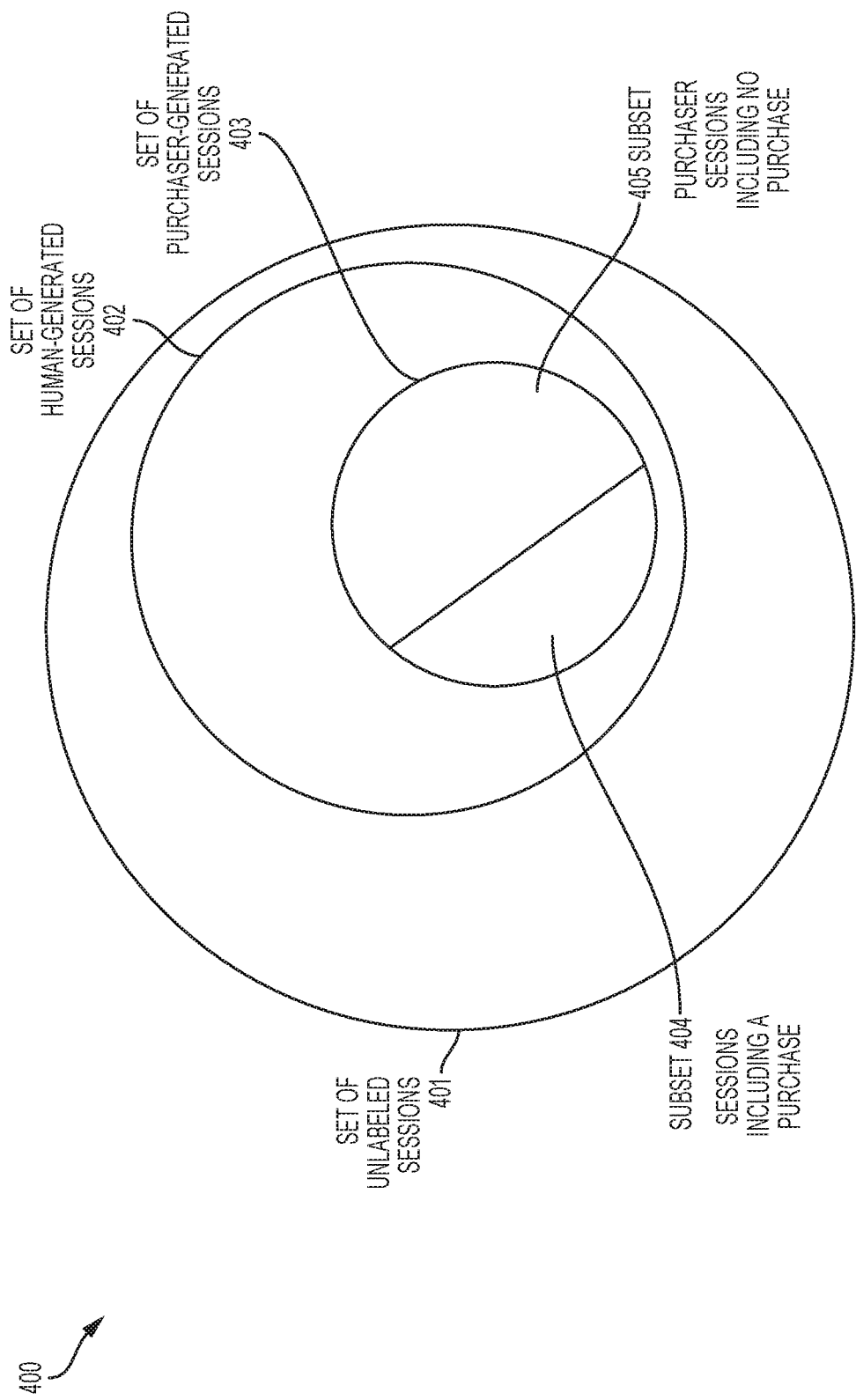
FIG. 4 is a diagram indicating relationships between one or more sets of network sessions, according to certain embodiments.

In some embodiments, a session identification system, such as described in regards to FIGS. 1 and 2, classifies network sessions as human-generated or as non-human. In some cases, the classification is based on one or more probabilities describing a given network session in relation to a set of sessions. FIG. 4 depicts a diagram 400 (e.g., a Venn diagram) indicating some relationships between one or more sets of network sessions. The diagram 400 includes a set of unlabeled network sessions 401. The unlabeled sessions 401 are network sessions between client computing systems and one or more of a network application server or a network application. In some cases, the unlabeled sessions 401 are network sessions with a particular application or server. Additionally or alternatively, the unlabeled sessions 401 are with multiple applications or servers. Furthermore, the unlabeled sessions 401 are associated with one or more of historical network sessions or current network sessions.

In an embodiment, the set of unlabeled sessions 401 includes sessions requested by multiple client computing systems, such as the client computing systems 120 as described in regards to FIG. 1. The client computing systems request one or more sessions under the direction of human users or non-human users (e.g., a bot). The sessions include, for example, one or more features that are associated with the originators of respective sessions, such as features indicating a computing device, a software application (e.g., a browser, a background process), or a time duration between interactions with the network application.

In some cases, the total number of sessions included in the set of unlabeled sessions 401 is known. Additionally or alternatively, each of the sessions included in the set of unlabeled sessions 401 is associated with one or more session features. For convenience, and not by way of limitation, the session features for a given session are represented by the feature vector X. For example, a first session in set 401 has a feature vector $X_1$, a second session has the feature vector $X_2$, and an nth session has the feature vector $X_n$.

In the set of unlabeled sessions 401, the feature vector $X_i$ for a particular session i includes indications of whether or not the session i has a particular session feature. For example, a respective feature vector X includes an origination feature indicating that the respective session originated from a human or from a non-human. For convenience, and not by way of limitation, the origination feature is represented by y, and has a value of 1 for a session originating from a human and a value of 0 for a session originating from a non-human, as indicated by Equation 1.

$y=1$, human session $y=0$, non-human session                  Eq. 1

The set of unlabeled sessions 401 includes a subset of sessions originating from humans and a subset of sessions originating from non-humans. For example, the set of human-generated sessions 402 is included in the set of unlabeled sessions 401. In some cases, the number of sessions included in the set of human sessions 402 is unknown. The session i in the set of unlabeled sessions 401 has a probability of being included in the set of human sessions 402. Additionally or alternatively, the feature vector $X_i$ for the session i has a probability of having the origination feature y with a value of 1, as indicated by Equation 2. In some cases, the probability that the given session in the set of unlabeled sessions 401 is also included in the set of human sessions 402 is provided by Equation 2.

$$P(y=1|X_i)$$                  Eq. 2

In some cases, the set of unlabeled sessions 401 includes a subset of sessions that have a session feature associated with human-generated network traffic. For example, the set of unlabeled sessions 401 includes a subset 404 of network sessions that include one or more purchases. In diagram 400, the session feature associated with human-generated network traffic is the inclusion of one or more purchases in a session. However, other human-associated session features are envisioned.

Additionally or alternatively, a respective feature vector X includes a purchase feature indicating that the respective session included one or more purchases. For convenience, and not by way of limitation, the purchase feature is represented by b, and has a value of 1 for a session including at least one purchase and a value of 0 for a session including no purchases, as indicated by Equation 3.

$b=1$, purchase session $b=0$, non-purchase session                  Eq. 3

In some cases, the session identification system determines the subset 404 of purchase sessions, such as based on the presence of the purchase feature b. Additionally or alternatively, the session identification system determines a set 403 of sessions generated by a purchaser, such as by identifying an additional session feature that is included in the subset 404 of purchase sessions. In addition, the session identification system determines a subset 405 of sessions that are generated by a purchaser but which do not include a purchase. In some cases, the number of sessions included in the set 403 and the subset 405 are known.

In some embodiments, the session i in the set of unlabeled sessions 401 has a probability of being included in the subset 404 of purchase sessions. Additionally or alternatively, the feature vector $X_i$ for the session i has a probability of having the purchase feature b with a value of 1, as indicated by Equation 4. In some cases, the probability that the session i in the set of unlabeled sessions 401 is also included in the subset 404 of purchase sessions is provided by Equation 4.

$$P(b=1|X_i) \qquad \text{Eq. 4}$$

In addition, the Equation 4 is marginalized over y. For example, the probability that a feature vector X has a purchase feature b with a value of 1 is equivalent to the probability that X has b with a value of 1 and y with a value of 1 summed with the probability that X has b with a value of 1 and y with a value of 0, as indicated by Equation 5. In some cases, Equation 5 indicates that the probability of the session i being a purchase session (e.g., b=1) is equal to the probability of session i being a purchase, human session (e.g., b=1, y=1) summed with the probability of session i being a purchase, non-human session (e.g., b=1, y=0).

$$P(b=1|X_i)=P(b=1,y=1|X_i)+P(b=1,y=0|X_i) \qquad \text{Eq. 5}$$

In some cases, the total number of sessions included in the subset of purchase sessions 404 is known. For example, a session identification system, as described in regards to FIGS. 1 and 2, determines a number of purchase sessions in the subset 404 based on the analysis of session data describing the set of unlabeled sessions 401. Additionally or alternatively, the feature vector $X_i$ for a particular session i in the subset 404 has the purchase feature b with a value of 1. Based on the determination that b=1 (e.g., a purchase session) is associated with human-generated network traffic, the subset 404 is determined to be included in the set of human-generated sessions 402 (e.g., goods or services are not purchased by bots). Additionally or alternatively, the determination that b=1 is associated with human-generated network traffic indicates that the probability of the session i included in subset 404 being a purchase, non-human session is zero, as indicated by Equation 6.

$$P(b=1|X_i)=P(b=1,y=1|X_i)+0 \qquad \text{Eq. 6}$$

In some cases, the Equation 6 is expanded using the conditional probability expansion, as indicated by Equation 7. Additionally or alternatively, the Equation 7 indicates that the probability that the session i is a purchase session is equal to the probability that the session i is a human session multiplied by the probability that the session i is a purchase session given that session i is a human session.

$$P(b=1|X_i)=P(y=1|X_i)P(b=1|y=1,X_i) \qquad \text{Eq. 7}$$

Additionally or alternatively, the Equation 7 is rearranged to provide Equation 8, indicating that the probability that the session i is a human session is equal to the probability that the session i is a purchase session divided by the probability that session i is a purchase session given that session i is a human session.

$$P(y=1|X_i) = \frac{P(b=1|X_i)}{P(b=1|y=1,X_i)} \qquad \text{Eq. 8}$$

In diagram 400, the probability that the particular session i in the set of unlabeled sessions 401 is also included in the set of human sessions 402 is provided by Equation 8. In some embodiments, a session identification system, such as session identification system 210, identifies the probability of each session in an unlabeled set being a human session, based on a combination, such as via Equation 8, of the probability that each session is a purchaser session and the probability that each session is a purchaser session given that the respective session is a human session. For example, the session identification system 210 receives session data 233 representing the set of unlabeled sessions 401, and determines the labeled subset 240 including the subset 404 of sessions including a purchase. The classifier 211 included in the session identification system 210 generates, for example, a first probability 212 indicating that the ith session represented by the session data 233 is a purchase session, based on the set 401 and the subset 404. Additionally or alternatively, the session identification system 210 determines the derived subset 245 including one or more of set 403 of purchaser sessions or subset 405 of purchaser sessions that do not include a purchase. The classifier 215 included in the session identification system 210 generates, for example, a second probability 216 indicating that the ith session represented by the session data 233 is a purchase session given that the ith session is generated by human, based on one or more of the sets 401 and 403 and the subsets 404 and 405. Based on a combination of the first and second probabilities 212 and 216, the session identification system 210 determines, via Equation 8, the probability that the ith session represented by the session data 233 is generated by a human.

In an embodiment, a classifier included in a session identification system generates a probability describing the ith session based on the feature vector $X_i$ describing the session i. For example, the session data 233 includes a respective feature vector $X_i$ describing the ith session represented by the session data 233. In some cases, the classifier 211 generates the probability 212 for the ith session based on a classification of the feature vector Xi included in the session data 233. The feature vector Xi is classified, for example, based on a similarity with the feature vectors included in the labeled subset 240. Additionally or alternatively, the classifier 215 generates the probability 216 for the ith session based on a similarity of the feature vector Xi with the feature vectors included in the derived subset 245. In some embodiments, a respective probability 212 and probability 216 are generated for each respective session represented by the session data 233. Additionally or alternatively, the session identification system 210 determines a respective combination of the probabilities 212 and 216 for each respective session represented by the session data 233.

Example of a Computing System for Classifying Network Traffic

Figure 5:
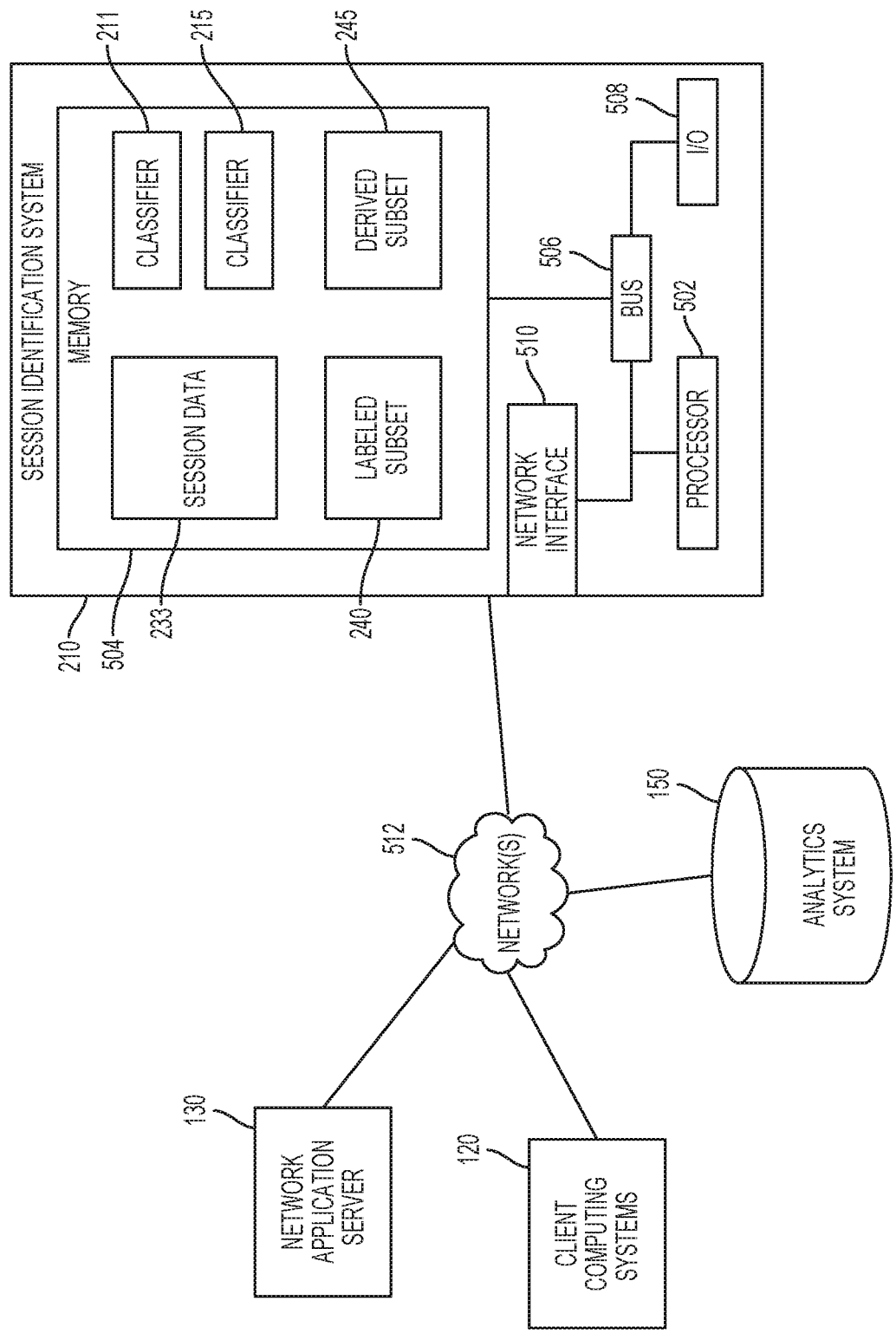
FIG. 5 is a block diagram depicting an example of a computing system for implementing a session identification system, according to certain embodiments.

Any suitable computing system or group of computing systems can be used for performing the operations described herein. For example, FIG. 5 is a block diagram depicting a system for classifying network traffic as human-generated or non-human, according to certain embodiments. In some embodiments, one or more of the computing systems depicted in FIG. 5 are included in a given computing device, such as a personal computer or a server device. Additionally or alternatively, one or more of the computing systems depicted in FIG. 5 are included in a distributed or virtual computing system, such as a group of computing devices operating together or a cloud-based computing system.

The depicted example of a session identification system 210 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the session data 233, the classifiers 211 or 215, the labeled subset 240, the derived subset 245, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The session identification system 210 may also include a number of external or internal devices such as input or output devices. For example, the session identification system 210 is shown with an input/output ("I/O") interface 508 that can receive input from input devices or provide output to output devices. A bus 506 can also be included in the session identification system 210. The bus 506 can communicatively couple one or more components of the session identification system 210.

The session identification system 210 executes program code that configures the processor 502 to perform one or more of the operations described above with respect to FIGS. 1-4. The program code includes operations related to, for example, one or more of the session data 233, the classifiers 211 or 215, the labeled subset 240, the derived subset 245, or other suitable applications or memory structures that perform one or more operations described herein. The program code may be resident in the memory device 504 or any suitable computer-readable medium and may be executed by the processor 502 or any other suitable processor. In some embodiments, the program code described above, the session data 233, the classifiers 211 and 215, the labeled subset 240, or the derived subset 245 are stored in the memory device 504, as depicted in FIG. 5. In additional or alternative embodiments, one or more of the session data 233, the classifiers 211 and 215, the labeled subset 240, the derived subset 245, and the program code described above are stored in one or more memory devices accessible via a data network, such as a memory device accessible via a cloud service.

The session identification system 210 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. The network application server 130 is connected to the session identification system 210 via network 512, and the network application server 130 can perform some of the operations described herein, such as providing session data 233. The session identification system 210 is able to communicate with one or more of the network application server 130 and the analytics system 150 using the network interface 510. In some cases, the client computing systems 120 are able to communicate with one or more of the network application server 130, the analytics system 150, or the session identification system 210 using the network 512.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
receiving data describing a set of network sessions with a network application, wherein the received data lacks labeling information indicating a class for each network session in the set of network sessions;
determining a labeled subset of the network sessions, wherein each of the network sessions included in the labeled subset has an identified session feature associated with human-generated network traffic;
generating, via a first classifier and based on the determining of the labeled subset, a first probability indicating that a feature vector for a particular unlabeled network session includes the identified session feature;
determining a derived subset of the network sessions, wherein each of the network sessions included in the derived subset has an additional session feature that is associated with at least one of the network sessions included in the labeled subset;
generating, via a second classifier and based on the determining of the derived subset, a second probability indicating that, given that the feature vector for the particular unlabeled network session includes the additional session feature, the feature vector for the particular unlabeled network session also includes the identified session feature;
determining, based on a combination of the first probability and the second probability, a third probability indicating that the particular unlabeled network session is a human-generated network session;
generating, based on the third probability, classification data indicating the particular unlabeled network session as the human-generated network session or as a non-human network session; and
providing the classification data to an additional computing system that is configured to, based on the classification data, perform an operation related to the particular unlabeled network session.

2. The method of claim 1, wherein the set of network sessions includes a set of unlabeled network sessions, and wherein the received data includes session features associated with the set of unlabeled network sessions.

3. The method of claim 2, wherein the session features associated with each particular network session included in the set of unlabeled network sessions are represented by a respective feature vector.

4. The method of claim 3, further comprising:
classifying, by the first classifier, each particular network session based on a first comparison of the respective feature vector with one or more additional feature vectors associated with the labeled subset, and
classifying, by the second classifier, each particular network session based on a second comparison of the respective feature vector with one or more additional feature vectors associated with the derived subset.

5. The method of claim 1, wherein the identified session feature associated with human-generated network traffic comprises a network interaction indicating a purchase via the network application.

6. The method of claim 1, wherein the data describing the set of network sessions describes one or more historical sessions.

7. The method of claim 1, wherein
providing the classification data to the additional computing system includes providing, to the network application, the classification data of the particular unlabeled network session.

8. A non-transitory computer-readable medium embodying program code comprising instructions which, when executed by a processor, cause the processor to perform operations comprising:
receiving data describing a set of network sessions with a network application, wherein the received data lacks labeling information indicating a class for each network session in the set of network sessions;
determining a labeled subset of the network sessions, wherein each of the network sessions included in the labeled subset has an identified session feature associated with human-generated network traffic;
generating, via a first classifier and based on the determining of the labeled subset, a first probability indicating that a feature vector for a particular unlabeled network session includes the identified session feature;
determining a derived subset of the network sessions, wherein each of the network sessions included in the derived subset has an additional session feature that is associated with at least one of the network sessions included in the labeled subset;
generating, via a second classifier and based on the determining of the derived subset, a second probability indicating that, given that the feature vector for the particular unlabeled network session includes the additional session feature, the feature vector for the particular unlabeled network session also includes the identified session feature;
determining, based on a combination of the first probability and the second probability, a third probability indicating that the particular unlabeled network session is a human-generated network session;
generating, based on the third probability, classification data indicating the particular unlabeled network session as the human-generated network session or as a non-human network session; and
providing the classification data to an additional computing system that is configured to, based on the classification data, perform an operation related to the particular unlabeled network session.

9. The non-transitory computer-readable medium of claim 8, wherein the set of network sessions includes a set of unlabeled network sessions, and wherein the received data includes session features associated with the set of unlabeled network sessions.

10. The non-transitory computer-readable medium of claim 9, wherein the session features associated with each particular network session included in the set of unlabeled network sessions are represented by a respective feature vector.

11. The non-transitory computer-readable medium of claim 10, wherein the operations further comprise:
classifying, by the first classifier, each particular network session based on a first comparison of the respective feature vector with one or more additional feature vectors associated with the labeled subset, and
classifying, by the second classifier, each particular network session based on a second comparison of the respective feature vector with one or more additional feature vectors associated with the derived subset.

12. The non-transitory computer-readable medium of claim 8, wherein the identified session feature associated with human-generated network traffic comprises a network interaction indicating a purchase via the network application.

13. The non-transitory computer-readable medium of claim 8, wherein
providing the classification data to the additional computing system includes providing, to the network application, the classification data.

14. A system comprising:
one or more processing devices; and
one or more memory devices communicatively coupled to the one or more processing devices, the one or more memory devices storing instructions which, when executed by the one or more processing devices, configure the system for:
receiving data describing a set of network sessions with a network application, wherein the received data lacks labeling information indicating a class for each network session in the set of network sessions;
determining a labeled subset of the network sessions, wherein each of the network sessions included in the labeled subset has an identified session feature associated with human-generated network traffic;
generating, via a first classifier and based on the determining of the labeled subset, a first probability indicating that a feature vector for a particular unlabeled network session includes the identified session feature;
determining a derived subset of the network sessions, wherein each of the network sessions included in the derived subset has an additional session feature that is associated with at least one of the network sessions included in the labeled subset;
generating, via a second classifier and based on the determining of the derived subset, a second probability indicating that, given that the feature vector for the particular unlabeled network session includes the additional session feature, the feature vector for the particular unlabeled network session having the additional session feature also has includes the identified session feature;
determining, based on a combination of the first probability and the second probability, a third probability indicating that the particular unlabeled network session is a human-generated network session; and
generating, based on the third probability, classification data indicating the particular unlabeled network session as the human-generated network session or as a non-human network session; and
providing the classification data to an additional computing system that is configured to, based on the classification data, perform an operation related to the particular unlabeled network session.

15. The system of claim 14, wherein the set of network sessions includes a set of unlabeled network sessions, and wherein the received data includes session features associated with the set of unlabeled network sessions.

16. The system of claim 15, wherein the session features associated with each particular network session included in the set of unlabeled network sessions are represented by a respective feature vector.

17. The system of claim 16, further configured for:
classifying, by the first classifier, each particular network session based on a first comparison of the respective feature vector with one or more additional feature vectors associated with the labeled subset, and
classifying, by the second classifier, each particular network session based on a second comparison of the respective feature vector with one or more additional feature vectors associated with the derived subset.

18. The system of claim 14, wherein the identified session feature associated with human-generated network traffic comprises a network interaction indicating a purchase via the network application.

19. The system of claim 14, wherein the data describing the set of network sessions describes one or more historical sessions.

20. The system of claim 14, wherein providing the classification data to the additional computing system includes providing, to the network application, the classification data.

* * * * *